United States Patent [19]

Abrahamson

[11] Patent Number: 4,800,767

[45] Date of Patent: Jan. 31, 1989

[54] ACCELERATION CONTROL DEVICE FOR A HYDRAULIC DRIVE UNIT

[75] Inventor: Daniel P. Abrahamson, Phoenix, Ariz.

[73] Assignee: Builders Equipment Company, Phoenix, Ariz.

[21] Appl. No.: 58,989

[22] Filed: Jun. 8, 1987

[51] Int. Cl.[4] .......................... F16H 21/26; G05G 1/04

[52] U.S. Cl. .......................................... 74/38; 74/106; 74/520

[58] Field of Search ............................ 74/106, 38, 520

[56] References Cited

U.S. PATENT DOCUMENTS

| | | | |
|---|---|---|---|
| 2,318,814 | 5/1943 | Strong | 74/520 |
| 2,369,362 | 2/1945 | Marziani | 74/106 |
| 2,580,487 | 1/1952 | Vigmostad | 74/520 |
| 3,135,440 | 6/1964 | Baran | 74/520 |
| 3,144,776 | 8/1964 | Minke | 74/520 |
| 3,437,191 | 4/1969 | Auernhammer et al. | 198/135 |
| 3,452,623 | 7/1969 | Bastian | 74/520 |
| 3,614,151 | 10/1971 | Shadle | 74/106 |
| 3,650,107 | 3/1972 | Court | 60/53 R |
| 3,653,208 | 4/1972 | Kubik | 60/52 VS |
| 3,738,110 | 6/1973 | Grosseau | 60/368 |
| 3,748,857 | 7/1973 | Heiser | 60/388 |
| 3,831,379 | 8/1974 | Lixenfeld et al. | 60/446 |
| 3,943,716 | 3/1976 | Andersson | 60/444 |
| 3,952,513 | 4/1976 | Kubik | 60/435 |
| 4,048,004 | 9/1977 | Watkins | 74/520 |
| 4,051,746 | 10/1977 | Liljeros | 74/520 |
| 4,479,751 | 10/1984 | Wyman et al. | 74/106 |
| 4,528,814 | 7/1985 | Stuhr | 60/419 |
| 4,681,022 | 7/1987 | Schwing | 74/106 |

FOREIGN PATENT DOCUMENTS

| | | | |
|---|---|---|---|
| 2526040 | 12/1976 | Fed. Rep. of Germany | 74/520 |

*Primary Examiner*—Dirk Wright
*Assistant Examiner*—Harold F. Macris
*Attorney, Agent, or Firm*—Luedeka, Hodges & Neely

[57] ABSTRACT

An acceleration control device for a hydraulic drive unit having a rotatable control shaft movable between an on position and an off position. An arm is connected to the control shaft for rotating the shaft between the off and on positions. A motive apparatus is movable between a first position which corresponds to the off position of the control shaft and a second position which corresponds to the on position of the control shaft. A mechanical linkage is connected between the motive apparatus and the arm. The linkage imparts movement to the arm in response to movement of the motive apparatus to cause the control shaft to move between the off and on positions as the motive apparatus moves between the first and second positions, respectively. The linkage is configured to provide a substantially nonlinear relationship between the speed of the arm and the speed of the motive apparatus. The linkage is further configured so that the speed of the arm is at a minimum in relation to the speed of the motive apparatus when the control shaft is immediately adjacent its off position. The speed of the arm increases in relation to the speed of the motive means as the control shaft is moved away from its off position.

11 Claims, 2 Drawing Sheets

ACCELERATION CONTROL DEVICE FOR A HYDRAULIC DRIVE UNIT

Figure 1:
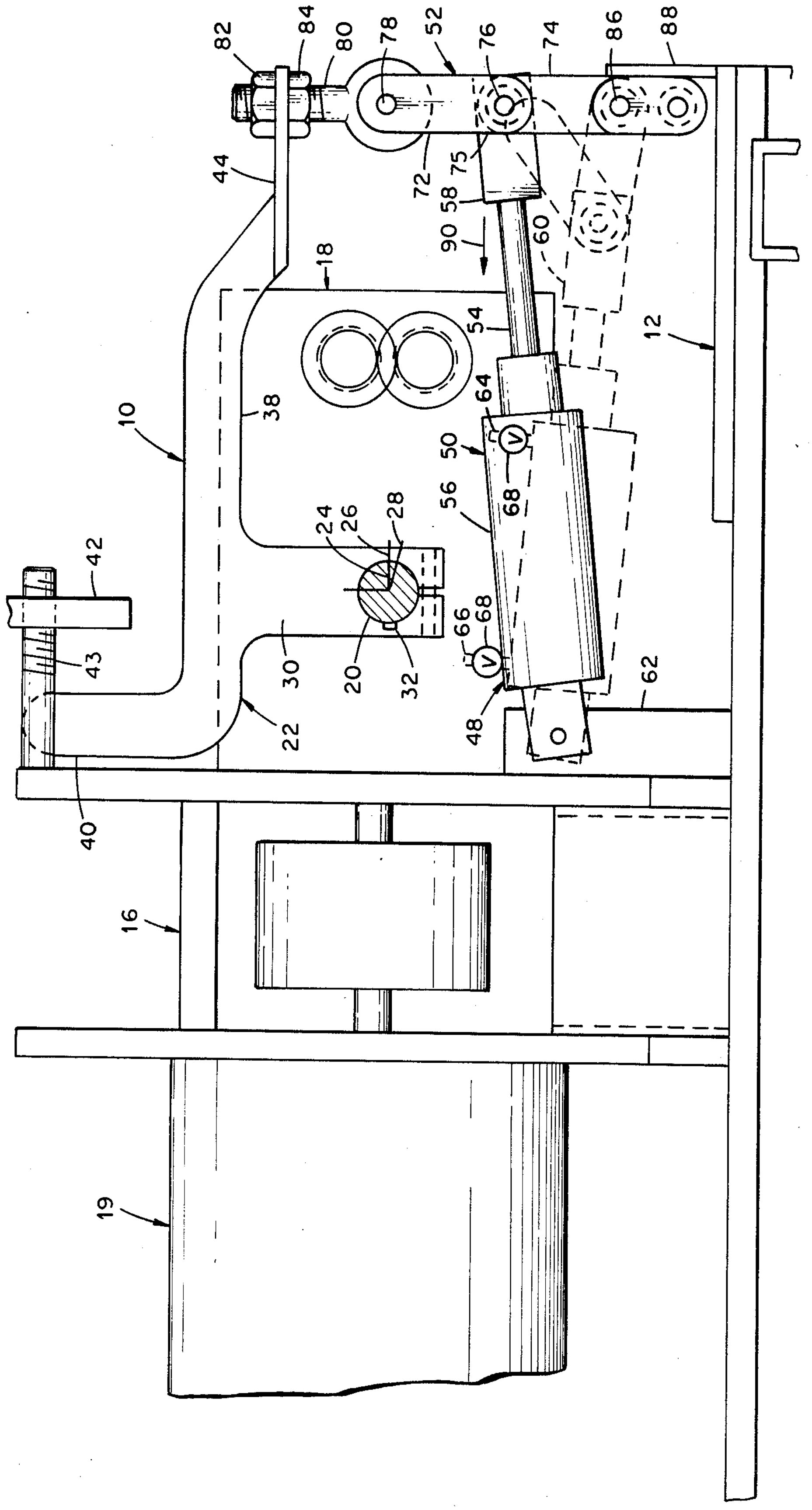

The present invention relates to acceleration control devices for hydraulic drive units and more particularly relates to an acceleration control device for controlling the operation of a hydraulic drive unit which is used to provide motive power for material transfer apparatus.

Among the numerous uses for hydraulic drive units is that of providing motive power to material transfer apparatus such as conveyors. Typically, the units include a prime mover or rotative power source such as an electric motor and a hydraulic pump driven by the motor. The pump is operatively connected to a hydraulic motor which in turn imparts the desired movement to the conveyor. The output of the pump and thus the movement of the conveyor is usually controlled by rotating a control shaft or pintle at an essentially fixed speed through a predetermined angular displacement between an off position and an on position such as by servo control, by manually turning the shaft, or other means.

Where breakable items are being transported, such as stacks of cement blocks or the like, significant damage can occur when the conveyor is started or stopped due to the acceleration and deceleration which occurs adjacent the stationary position. For example, the items may shift or topple from a previous stacked relationship into contact with an adjacent stack, the conveyor surface, or the floor resulting in damage or breakage of the items. In addition, it is often desired to maintain a predetermined arrangement or spacing of the items to enable sequential operations to be performed at spaced intervals. Movement of the items during starting and stopping can disturb the predetermined arrangement and thus interfere with the intended operations. Consequently, it is desirable to control the rate of acceleration of material transfer apparatus powered by hydraulic drive units and in particular to reduce the rate of acceleration during starting and stopping of the apparatus so as to minimize problems of the type mentioned above.

Known approaches to the problem of controlling the acceleration of hydraulic drive units of the type described have typically involved complicated electrical, pneumatic or mechanical apparatus and are often difficult to operate and maintain.

It is therefore an object of the present invention to provide an acceleration control device for a hydraulic drive unit having a rotatable control shaft.

A further object of the invention is to provide an acceleration control device of the character described for use with a hydraulic drive unit which is used to power a material transfer apparatus, the device being configured to rotate the control shaft of the drive unit in such a way as to effect smooth acceleration of the material transfer apparatus.

Another object of the invention is to provide an acceleration control device for a hydraulic drive unit which is simple in construction and operation.

Figure 2:
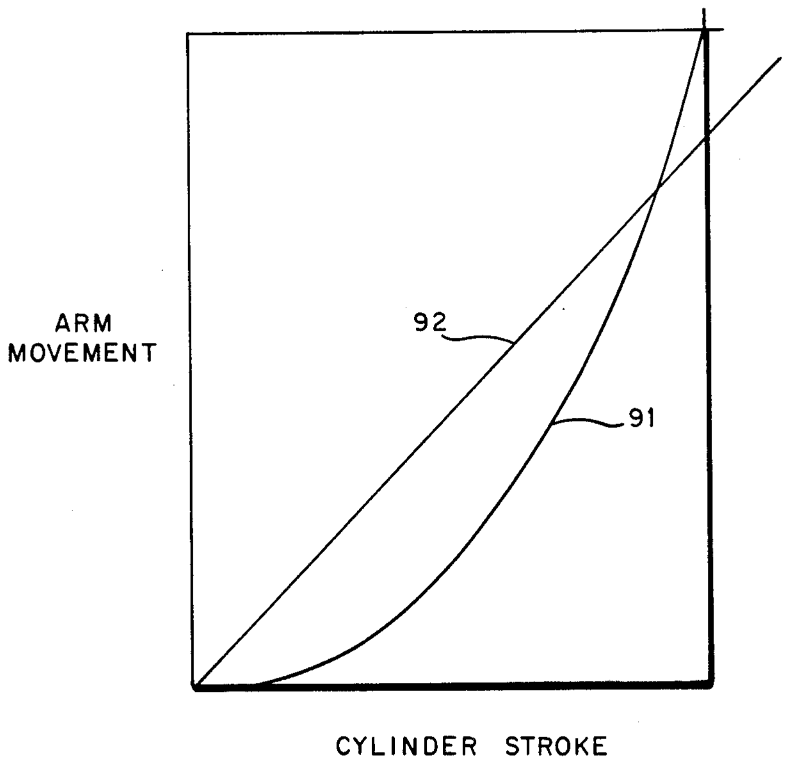

These and other objects and advantages of the present invention will become apparent from the following detailed description of a preferred embodiment when considered in conjunction with the accompanying drawing in which:

FIG. 1 is a diagrammatic view illustrating an acceleration control device for a hydraulic drive unit according to a preferred embodiment of the present invention; and FIG. 2 is a graphical illustration depicting a nonlinear relationship between portions of the device shown in FIG. 1.

In general, the invention includes an acceleration control device for a hydraulic drive unit having a rotatable control shaft movable between an off position and an on position. In a preferred embodiment, the device comprises an arm connected to the control shaft for rotating the shaft between the off and on positions, support means, and motive apparatus supported on the support means. The motive apparatus has a movable element and is actuable to move the element between a first position which corresponds to the off position of the control shaft and a second position which corresponds to the on position of the control shaft. Provision is made for actuating the motive apparatus to move the element between the first and second positions. A mechanical linkage is connected between the movable element of the motive apparatus and the arm. The linkage imparts movement to the arm in response to movement of the element and is configured so that movement of the arm in response to movement of the element between its first and second positions causes the control shaft to move between its off and on positions, respectively. The linkage is further configured to provide a substantially nonlinear relationship between the speed of the arm and the speed of the movable element, the speed of the arm being at a minimum in relation to the speed of the movable element when the control shaft is immediately adjacent its off position and the speed of the arm increasing in relation to the speed of the movable element as the control shaft is moved away from its off position. In the particular case of a hydraulic drive unit which is used to power a conveyor, this provides smooth acceleration of the conveyor because the speed of the control shaft in relation to the speed of the movable element is at a minimum adjacent the off position of the control shaft. As a consequence, problems associated with starting and stopping of the conveyor are minimized.

Referring now to FIG. 1, an acceleration control device designated generally by the reference character 10 is shown illustrating a preferred embodiment of the present invention. As used herein, the term "acceleration" means both positive and negative acceleration (deceleration). The device 10 includes a support 12 which may be a portion of the support for a hydraulic drive unit represented diagrammatically at 16. The unit 16 may be of the hydrostatic or open loop type, for example, having a pump 18 employing hydraulic fluid as the pumping medium and a suitable power source such as electrical motor 19 drivingly connected to the pump 18.

The pump 18 may be a variable displacement piston-type which circulates the hydraulic fluid under pressure through a hydraulic fluid network (not shown) to produce work. For example, the pump may be an in-line piston pump with variable displacement such as the pumps sold by Sperry and Vickers of Troy, Mich., under the product designations PVB 5 and PVB 6.

One useful application of the unit 16 is to impart motion to a material transfer apparatus such as a conveyor (not shown). Inasmuch as the construction details and operation of the drive unit 16, its associated components, and its employment to impart movement to a conveyor are wellknown to those skilled in the art, the details of the same are omitted. However, it is noted that pumps which comprise units of this type are often operated by a control shaft or pintle shown in the drawing at 20 and projecting from the side of the pump 18, and it is to this type of pump that the present invention is particularly directed. The control shaft 20 is rotatable through a predetermined angular displacement (0 degrees to 22 degrees, for example) between an off position and a full on position. Displacement may be negative or positive from a reference position (0 degrees corresponding to the off position) to effect forward or reverse motion of the conveyor.

When the shaft 20 is in the off position, no fluid is pumped although the motor typically continues to operate. When the shaft 20 is moved from the off position to the on position, it cooperates with internal elements of the pump to establish a pumping action causing pressurized hydraulic fluid to flow from the pump.

In the illustrated embodiment, the device 10 includes an arm 22 connected to the shaft 20 to rotate the shaft 20 between an off position and a full on position. The off and on positions are illustrated in FIG. 1 by the alignment of line 24 radiating from the center of the shaft 20 with points 26 and 28 which are arbitrary points about the axis of the shaft 20. Hereinafter, the off and on positions of the shaft 20 will be indicated by reference to characters 26 and 28, respectively.

The arm 22 is preferably in the form of a T and includes a split base 30 which is fixedly connected at its lower end to the shaft 20 as by a key 32 disposed between an opening 34 in the base 30 and the shaft 20 in conventional fashion. The arm 22 further includes a bar 38 radially spaced from the axis of the shaft 20 essentially by the length of the base 30 and disposed generally perpendicular thereto. At one end of the bar 38 (the left end as viewed in FIG. 1), the arm 22 includes a finger 40 which is positionally associated with an adjustable stop 42. The stop 42 is preferably provided by a handle or the like which turns on a threaded rod 43 for movement toward or away from the finger 40 to stop movement of the arm 22 at a desired full on position 28 of the control shaft 20. The bar 38 extends to an end 44 which is disposed at the opposite end of the arm 22 from the finger 40.

It is noted that the stop 42, being adjustable, provides a convenient means of controlling the full on speed of the conveyor. When very fragile or easily shiftable products are being transported, the stop 42 may be positioned close to the finger 40 (when the control shaft 20 is in its off position 26) to reduce the full on speed of the conveyor and in the case of very stable or unbreakable items may be positioned farther from the finger 40 (when the control shaft 20 is in the off position 26) to increase the full on speed of the conveyor.

A motive apparatus 48 is preferably a double-acting pneumatic cylinder 50 and is connected by a mechanical linkage generally designated at 52 to the end 44 of the arm 22. The movable element of the cylinder 50, a rod 54, is reciprocally supported in the cylinder 50 in a conventional fashion for movement between first and second positions 58 and 60. The first position 58 of the rod 54 corresponds to the off position 26 of the control shaft 20 and the second position 60 of the rod 54 corresponds to the on position 28 of the shaft 20. Preferably, the cylinder 50 is pivotally connected at its base end to a brace 62 which in turn is securely mounted to the support 12 by suitable means.

Ports 64 and 66 on the cylinder 50 are selectively pressurized to move the rod 54 between the first position 58 and the second position 60 in a conventional fashion. Air is supplied to ports 64 and 66 at an appropriate pressure by suitable means such as a compressor (not shown) or from the plant compressed air and may be timed or controlled to correspond to desired movements of the conveyor. Preferably, a valve or other suitable control means is provided adjacent each of the ports 64 and 66 as at 68 to control the pressurization of the cylinder 50 so that the ultimate speed of the rod 54 and thus the time during which the rod 54 moves between its first and second positions 58 and 60 can be varied.

As mentioned, the mechanical linkage 52 is connected between the rod 54 and the arm 22. The linkage 52 imparts movement to the arm 22 in response to movement of the rod 54 to cause the control shaft 20 to move between the off and on positions 26 and 28 as the rod 54 moves between its first and second positions 58 and 60. The linkage 52 is configured to provide a substantially nonlinear relationship between the speed or angular velocity of the arm 22 (and thus the control shaft 20) and the speed of the rod 54, the speed of the arm 22 being at a minimum in relation to the speed of the rod 54 when the shaft 20 is immediately adjacent its off position 26, and the speed of the arm 22 increasing in relation to the speed of the rod 54 as the control shaft 20 is moved away from its off position 26.

In a preferred embodiment of the invention, the linkage 52 comprises a toggle joint which includes first and second links 72 and 74 pivotally interconnected at their inboard ends by a pin 76 to form a knee 75 which also provides a pivotal connection between the end of the rod 54 and the linkage 52. The outboard end of the first link 72 is pivotally connected by a pin 78 to an eyebolt 80 which in turn is adjustably secured to the end 44 of the arm 22 by nuts 82 and 84 to set and adjust the off position 26 of the control shaft 20. The outboard end of the second link 74 is pivotally connected by a pin 86 to a brace 88 which in turn is securely mounted by suitable means to the support 12.

The device 10 is preferably configured so that movement of the rod 54 away from the first position 58 occurs generally in an initial direction designated by arrow 90 in relation to the linkage 52. And, as shown, the linkage 52 is preferably configured so that the links 72 and 74 are substantially aligned and are disposed generally perpendicular to the initial direction of movement of the rod 54 from the first position 58.

As shown by the dotted outline in FIG. 1, movement of the rod 54 from its first position 58 to its second position 60 draws the knee 75 toward the cylinder 50 causing the links 72 and 74 to assume a folded configuration. This moves the end 44 of the arm 22 in the direction of the support 12, and causes rotation of the shaft 20 from the off position 26 to the on position 28 (dotted lines depicting the position of the arm 22 and eyebolt 80 when the rod 54 is in the second position 60 are omitted for the purpose of clarity).

It will be appreciated that movement of the rod 54 in the initial direction from the first position 58 produces only a very small downward movement of the end 44 of the arm 22 in relation to the distance of movement of the rod 54. That is, the speed or angular velocity of the arm 22 and thus of the shaft 20 in relation to the speed of the rod 54 is at a minimum immediately adjacent the off position 26 of the control shaft 20. The speed of the control shaft 20 in relation to the speed of the rod 54 increases gradually as the rod 54 is moved away from the first position 58. This is illustrated graphically in FIG. 2 by line 91 which shows a substantially nonlinear relationship between arm movement and cylinder stroke according to the previously described embodiment of the invention. For the purpose of comparison, line 92 is included in FIG. 2 showing a relationship between arm movement and cylinder stroke for known devices which rotate the shaft of a hydraulic drive unit by connecting a cylinder or the like directly to the shaft by a crank or other device. It is apparent that these devices operate with an essentially linear relationship between shaft rotation and cylinder stroke. This relationship between shaft rotation and cylinder stroke has been found to be unsatisfactory in many applications employing a hydraulic drive unit to power a material transfer apparatus such as a conveyor. For example, this movement is undesirable where breakable items are being conveyed in a stacked arrangement because starting and stopping movements characteristic of the relationship depicted by line 92 can topple the stacks resulting in significant damage. Such movements are also undesirable in those applications where it is important to maintain a predetermined arrangement of items which are subject to being shifted but not broken during starting and stopping of the conveyor. These and other problems are substantially overcome according to the preferred embodiment of the present invention because, as shown in FIG. 2, the speed of the arm 22 decreases gradually in relation to the speed of the rod 54 as the control shaft 20 approaches the off position 26, and increases gradually in relation thereto as the control shaft 20 moves away from the off position 26. This greatly reduces the likelihood that stopping and starting of the conveyor will result in movement of the items.

The preferred embodiment of the invention also enables the use of a conventional double-acting pneumatic cylinder 50 to power movement of the control shaft 20 so that advantage may be taken of the economy, simplicity and efficiency of such cylinders. The rod 54 of such cylinders ordinarily reaches an essentially constant speed almost immediately after leaving the first position. For this reason, it might be thought that these cylinders would not be effective or useful in providing a gradual change in the speed of the control shaft 20. However, the linkage 52 of the present invention prevents this initial rapid increase in speed from being translated to the control shaft 20 by producing a gradual change in the speed of rotation of the shaft 20 as it is moved from and toward its off position 26 by the cylinder 50.

Although a particular embodiment of the present invention has been described in the foregoing detailed description, it will be understood that the invention is capable of numerous rearrangements, modifications and substitutions of parts without departing from the scope and spirit of the invention as set forth in the claims below.

I claim:

1. An acceleration control device for a material transfer apparatus such as a conveyor or the like, comprising:

a hydraulic drive unit for imparting motion to the material transfer apparatus, said drive unit having a hydraulic fluid pump that provides power for moving the material transfer apparatus, the fluid output of said pump and thus the speed of the material transfer apparatus being determined by the position of a rotatable control shaft about its longitudinal axis between an off position corresponding to a low fluid output configuration of the pump and a stopped condition of the material transfer apparatus, and an on position corresponding to a high fluid output configuration of the pump and a moving condition of the material transfer apparatus, the change in the fluid output of the pump caused by rotation of said control shaft to positions between said off and on positions and thus the acceleration or deceleration of the material transfer apparatus being proportional to an arc length through which said control shaft is rotated;

crank means connected to said control shaft for rotating said control shaft about its longitudinal axis between said off and on positions in response to rotation of said crank means about the longitudinal axis of said control shaft, the arc length through which said control shaft is rotated being proportional to the arc length through which said crank means is rotated;

support means;

motive means supported on said support means, said motive means having a movable element and being configured to move said element through a distance between a first position which corresponds to the off position of said control shaft and a second position which corresponds to the on position of said control shaft;

actuation means for actuating said motive means to move said element between said first and second positions;

a mechanical linkage connected between said movable element of said motive means and said crank means to impart rotational movement to said crank means in response to movement of said element, said linkage being configured together with said crank means so that movement of said element between its first and second positions causing rotational movement of said crank means causes said control shaft to be rotated between its off and on positions, respectively; and said mechanical linkage being further configured to provide a substantially nonlinear relationship between the distance through which said movable element is moved by said motive means and the arc length through which said crank means is rotated by said movable element over a given time interval such that the arc length through which said crank means is rotated is at a minimum in relation to the distance through which said movable element is moved when said element is immediately adjacent its first position and the arc length through which said crank means is rotated increases gradually in relation to the distance through which said movable element is moved as said element is moved away from its first position, whereby said nonlinear relationship is also established between said movable element and said control shaft so that moving said movable element through said distance causes said control shaft and thus the material transfer apparatus to accelerate and decelerate gradually to minimize disturbances of the conveyed material associated with starting and stopping movements.

2. The device of claim 1, wherein said mechanical linkage is connected between said movable element and said support means and is configured to move said crank means in the direction of said support means in response to movement of said element from said first to said second positions.

3. The device of claim 1, wherein said movable element moves away from said first position in an initial direction of movement and said mechanical linkage is oriented generally perpendicular to the initial direction of movement of said movable element when said movable element is in said first position.

4. The device of claim 1, wherein said motive means comprises a pneumatic cylinder and said movable element comprises a rod reciprocally supported in said cylinder and pivotally connected to said mechanical linkage.

5. The device of claim 1, wherein said mechanical linkage comprises first and second elongate links, each of said links having an inboard and an outboard end and being pivotally interconnected at their inboard ends at a pivot point and pivotally connected at their outboard ends to said crank means and said support means, respectively, and said motive means comprises a cylinder having a base end and being pivotally connected at its base end to said support means, said movable element including a rod having an outboard end and being reciprocally supported in said cylinder and pivotally connected at its outboard end to said pivot point at the interconnection between said first and second links.

6. The device of claim 5, wherein said rod moves from said first position in an initial direction of movement and said first and second links are oriented generally perpendicular to the initial direction of movement of the rod when said rod is in said first position.

7. The device of claim 1, wherein said mechanical linkage comprises first and second elongate links pivotally interconnected at one of their ends at a pivot point and pivotally connected at their other ends to said crank means and said support means, respectively, and said movable element moves away from said first position in an initial direction of movement and said first and second links are oriented generally perpendicular to the initial direction of movement of said movable element when said movable element is in said first position.

8. The device of claim 1, wherein said support means is stationary in relation to the control shaft.

9. The device of claim 1, further comprising stop means for stopping movement of said crank means at the on and off positions of the control shaft.

10. An acceleration control device for a material transfer apparatus such as a conveyor or the like comprising:

a hydraulic drive unit for imparting motion to the material transfer apparatus, said drive unit having a hydraulic fluid pump that provides power for moving the material transfer apparatus, the fluid output of said pump and thus the speed of the material transfer apparatus being determined by the position of a rotatable control shaft about its longitudinal axis between an off position corresponding to a low fluid output configuration of the pump and a stopped condition of the material transfer apparatus, and an on position corresponding to a high fluid output configuration of the pump and a moving condition of the material transfer apparatus, the change in the fluid output of the pump caused by rotation of said control shaft to positions between said off and on positions and thus the acceleration or deceleration of the material transfer apparatus being proportional to an arc length through which said control shaft is rotated;

an arm fixedly connected to said control shaft for rotating said control shaft about its longitudinal axis between said on and off positions in response to rotation of said arm about the longitudinal axis of said control shaft, the arc length through which said control shaft is rotated being directly proportional to the arc length through which said arm is rotated;

support means, said support means being stationary with respect to said arm and said control shaft;

cylinder means pivotally connected to said support means, said cylinder means including a rod reciprocally supported in said cylinder means, and being actuable to move said rod through a distance between a first position corresponding to the off position of said control shaft and a second position corresponding to the on position of said control shaft, said rod moving in an initial direction from said first position;

actuation means for actuating said cylinder means to move said rod between said first and second positions;

first and second elongate links pivotally interconnected at one of their ends at a pivot point and pivotally connected at their other ends to said arm and said support means, respectively;

said rod of said cylinder means being pivotally connected to said pivot point interconnecting said first and said first and second links being oriented generally perpendicular to the initial direction of movement of said rod of said cylinder means when said rod is in said first position, where by moving said rod through said distance causes said control shaft and thus the material transfer apparatus to accelerate and decelerate gradually to minimize disturbances of the conveyed material associated with stopping and starting movements.

11. The device of claim 10, wherein said first and second links have substantially equal lengths.

* * * * *